US 6,525,902 B1

(12) United States Patent
Hu et al.

(10) Patent No.: US 6,525,902 B1
(45) Date of Patent: Feb. 25, 2003

(54) HIGH AREAL DENSITY THIN FILM MAGNETIC HEAD

(75) Inventors: Shouxiang Hu, Silver Spring, MD (US); James K. Price, Tonka Bay, MN (US); Sunita B. Gangopadhyay, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/416,234

(22) Filed: Oct. 12, 1999

Related U.S. Application Data
(60) Provisional application No. 60/104,306, filed on Oct. 13, 1998.

(51) Int. Cl.[7] .................................................. G11B 5/31
(52) U.S. Cl. ....................................................... 360/126
(58) Field of Search ................................ 360/126, 123, 360/317

(56) References Cited

U.S. PATENT DOCUMENTS

| | | | | |
|---|---|---|---|---|
| 5,245,493 A | * | 9/1993 | Kawabe et al. ............. 360/126 |
| 5,406,695 A | | 4/1995 | Amemori .................... 360/122 |
| 5,578,342 A | | 11/1996 | Tran et al. .................. 427/131 |
| 5,715,597 A | | 2/1998 | Aylwin et al. ........... 29/603.08 |
| 5,752,309 A | | 5/1998 | Partee et al. ............. 29/603.18 |
| 5,805,391 A | * | 9/1998 | Chang et al. ............... 360/126 |
| 5,828,533 A | * | 10/1998 | Ohashi et al. .............. 360/126 |
| 6,104,576 A | * | 8/2000 | Santini ....................... 360/126 |
| 6,111,724 A | * | 8/2000 | Santini ....................... 360/126 |
| 6,130,805 A | * | 10/2000 | Sasaki et al. ............... 360/126 |
| 6,137,652 A | * | 10/2000 | Ezaki et al. ................ 360/126 |
| 6,156,375 A | * | 12/2000 | Hu et al. .................... 360/126 |
| 6,163,436 A | * | 12/2000 | Sasaki et al. ............... 360/126 |
| 6,191,916 B1 | * | 2/2001 | Sasaki ........................ 360/126 |
| 6,204,997 B1 | * | 3/2001 | Sasaki ........................ 360/126 |
| 6,226,149 B1 | * | 5/2001 | Dill, Jr. et al. ............ 360/126 |
| 6,252,748 B1 | * | 6/2001 | Yamanaka et al. ......... 360/317 |
| 6,381,093 B2 | * | 4/2002 | Yoshida et al. ............ 360/126 |

* cited by examiner

*Primary Examiner*—Craig A. Renner

(57) ABSTRACT

A method of forming a thin film magnetic recording head includes forming a shared pole having a first pole tip, a first top pole segment having a second pole tip, and a write gap layer between the first pole tip and the second pole tip. A write coil can be formed after the first top pole segment and then a second top pole segment can be formed. The second top pole segment includes a connection to the first top pole segment and a connection to the shared pole. A thin film magnetic head includes a shared pole having a first pole tip, a first top pole segment having a second pole tip, a write gap layer positioned between the first pole tip and the second pole tip, a second top pole segment connected to the first top pole segment and to the shared pole, and a write coil positioned between the second top pole segment and the shared pole.

13 Claims, 4 Drawing Sheets

HIGH AREAL DENSITY THIN FILM MAGNETIC HEAD

CROSS REFERENCE TO RELATED APPLICATIONS

This application claims the benefit of provisional application entitled "High Areal Density And High Data Rate Thin Film Magnetic Recording Head," filed Oct. 13, 1998, bearing the Serial No. 60/104,306, the contents of which are relied upon and incorporated by reference.

BACKGROUND

Thin film magnetic recording heads are used in the data storage industry for recording data onto narrow tracks on a magnetic medium. In a hard disk drive, a thin film head may be mounted to a head-gimbal-assembly which is used to position the head over concentric data tracks on a disk surface. Thin film heads may also be used with other magnetic medium types.

A thin film head may be produced by laminating one or more layers of magnetic film onto a substrate (made of Ni—Zn ferrite or Alumina, for example). The completed head typically includes two conductive layers, called poles, separated by an insulating layer. The poles are conductively connected at one end and are separated by a thin insulating layer at another end so that the overall configuration has a somewhat horseshoe-like shape. Conductive wires are embedded within the insulating layer between the poles to form a coil that is used to read and write data to a magnetic medium.

During a write operation a magnetic flux is induced in the poles by an electrical current flowing through the coil. This magnetic flux flows through the connected conductive pole layers, but is impeded by their separation at the front gap. The pole separation at the front gap results in a discontinuity causing a magnetic field to protrude onto regions near the gap. This protruding field can be used to record data onto magnetic medium. In a digital storage device, changes in magnetic flux orientation caused by changes in the direction of current flow in the coil are used to write data to a magnetic medium. For example, a positive magnetic flux may be generated from a current flowing through the coil in a first direction, while a negative magnetic flux may be generated by changing the direction of the current. The positive and negative magnetic fluxes can be used to stored "1" and "0" bit values on the magnetic medium by vary the bias of magnetic dipoles in the medium. For example, a positive dipole bias may represent a "1" bit value while a negative bias may represent a "0" bit value.

Data may also be read from the magnetic medium using the same thin film head structure. When reading data, the write current is reduced or shut off so that the magnetic flux produced by the head is insufficient to change the orientation of magnetic dipoles in the medium. As the head passes over the medium, the magnetic flux produced by the dipoles in the medium induce a current in the coil windings that can be detected by read circuitry and decoded to determine a data stream.

SUMMARY

In general, in one aspect, the invention features a method of forming a thin film magnetic recording head. The method includes forming a shared pole having a first pole tip, a first top pole segment having a second pole tip, and a write gap layer between the first pole tip and the second pole tip. The method also includes forming a write coil after forming the first top pole segment and then forming a second top pole segment that includes a connection to the first top pole segment and a connection to the shared pole.

Implementations may include one or more of the following features. An air bearing surface can be formed by lapping portions of the first and second pole tips. Forming the shared pole may include forming a first shared pole layer that includes the first pole tip and a second shared pole layer. At least a portion of the second top pole segment may be formed over a zero throat insulating layer that covers a portion of the write gap layer material. The zero throat insulating layer may increase separation between the shared pole and the first top pole segment. The write coil may be formed by depositing a write coil insulator layer over the shared pole, forming a first coil pattern over the write coil insulating layer, and depositing coil material on top of the first coil pattern. Forming the first coil pattern may include depositing a seed layer over the write coil insulator layer, coating the seed layer with a protective mask, removing the protective mask to expose a portion of the seed layer to form the first coil pattern, and depositing a conductive material on top of the exposed portions of the seed layer.

In general, in another aspect, the invention features a thin film magnetic head. The head includes a shared pole having a first pole tip, a first top pole segment having a second pole tip, a write gap layer positioned between the first pole tip and the second pole tip, a second top pole segment connected to the first top pole segment and to the shared pole, and a write coil positioned between the second top pole segment and the shared pole.

Implementations of the thin film magnetic head may include one or more of the following features. An insulating layer may separate the write coil from the shared pole and the first top pole segment. The second top pole segment may include a connection extending through a center of the write coil and connecting to the shared pole. The head may include a zero throat insulating layer having a region of increasing separation between the shared pole and the first top pole segment. A second write coil may be coupled to the write coil and positioned between the shared pole and the second top pole segment.

In general, in another aspect, the invention features a method of forming a thin file magnetic head. The method includes depositing a series of layers on a substrate to form a shared pole layer that includes a first pole tip, a top pole layer that includes a second pole tip, a gap layer between the first pole tip and the second pole tip, and a connection between the top pole layer and the shared pole layer. The method also includes means for forming a write coil between the top pole layer and the bottom pole layer after the first pole tip and second pole tip are formed.

Implementations may include one or more of the following advantages. A write head top pole tip may have a low aspect ratio, write head manufacturing yield may be improved, and manufacturing consistency between write heads may be improved. The details of one or more embodiments of the invention are set forth in the accompanying drawings and the description below. Other features, objects, and advantages of the invention will be apparent from the description and drawings, and from the claims.

DETAILED DESCRIPTION

Figure 1A:
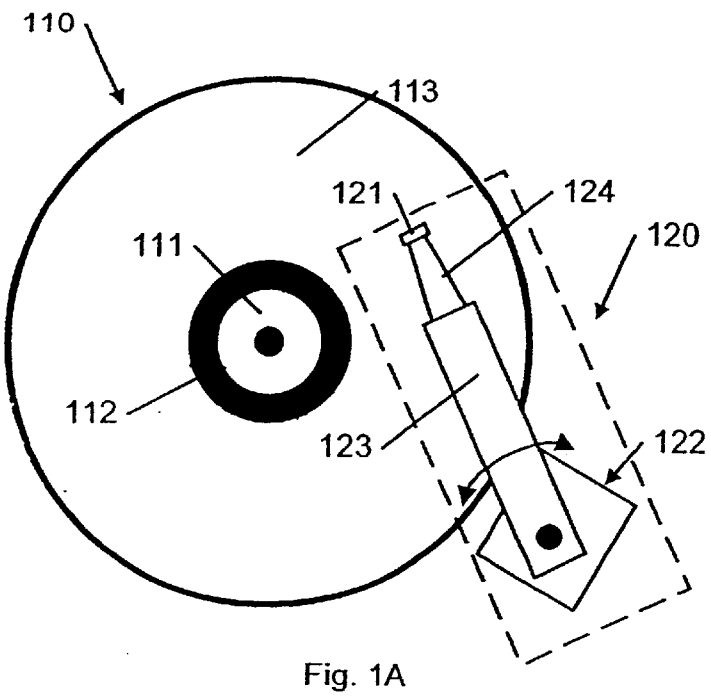
FIGS. 1A and 1B are schematic top views of disk drives.
Figure 1B:
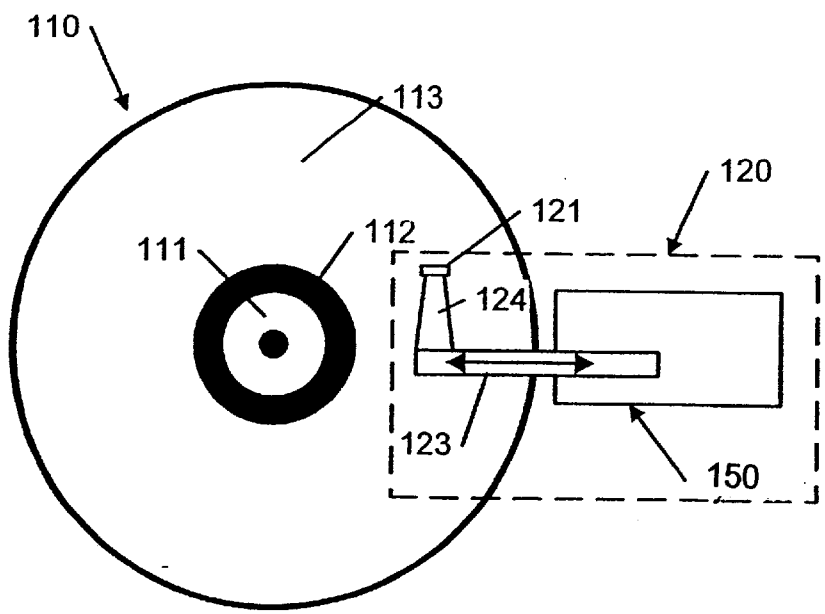
Figure 2:
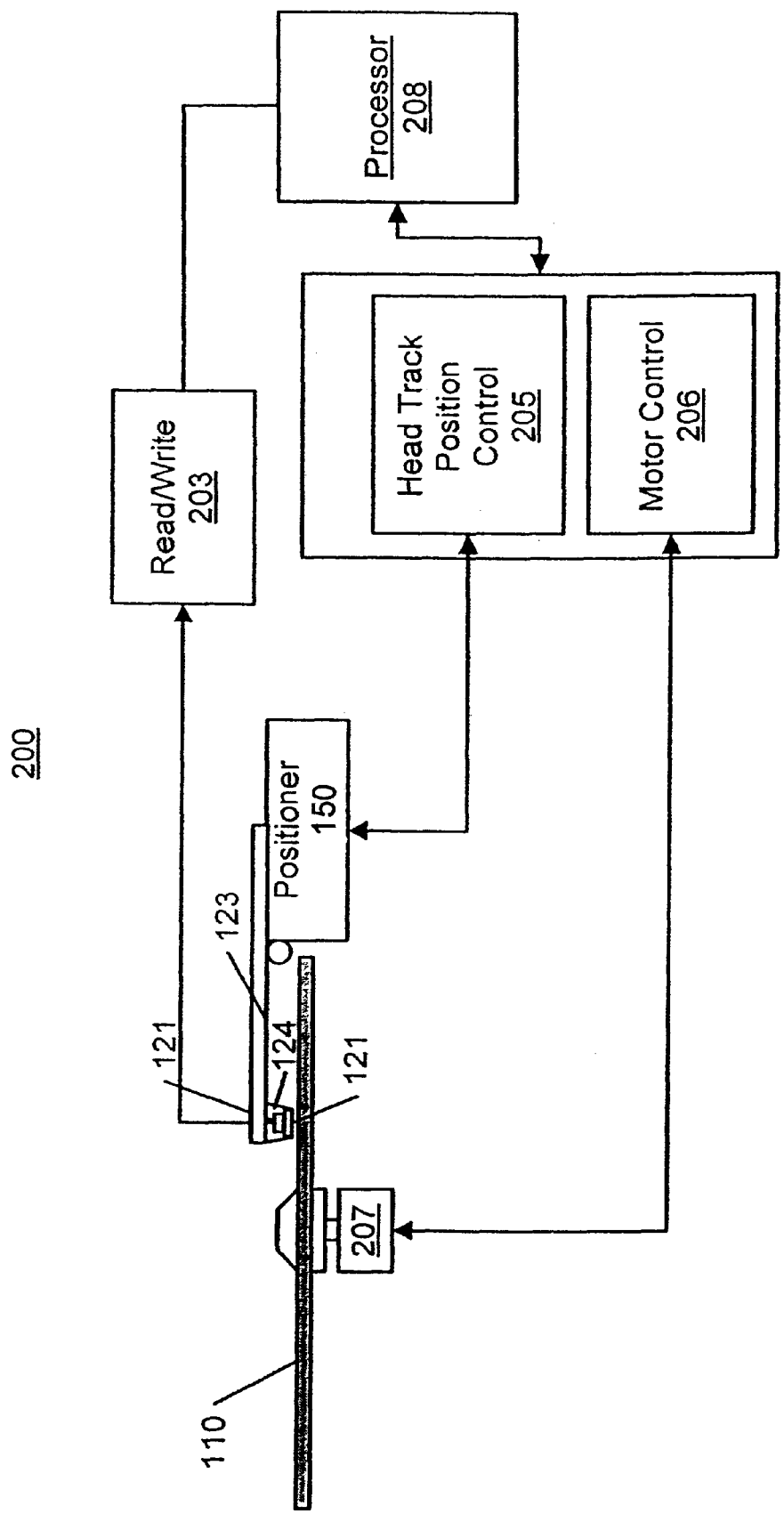
FIG. 2 is a schematic side view of a disk drive.

FIGS. 1A and 1B each show a top view of a magnetic disk 110 and a disk head assembly 120 for use in a disk drive. FIG. 2 shows a side view of a disk, disk head assembly, and other disk drive components. In FIG. 1A, the assembly 120 includes a rotary head positioning actuator 122 that moves arm 123 and attached head gimbal assembly (HGA) 124. The HGA includes a magnetic transducer or head 121 which is mounted to an air bearing slider that is attached to a suspension (also known as a flexure) by means of a gimbal type mounting. Typically, the head 121 is biased toward the magnetic surface of a disk by a predetermined bend in the suspension. In FIG. 1B the assembly 120 includes a linear head positioning actuator 150 instead of the rotary actuator of FIG. 1A.

A typical disk 110 is formed on an NiP coated aluminum alloy or glass substrate to which various coatings are sequentially applied. Typical coatings include an underlayer of chromium or a chromium alloy, a magnetic layer of cobalt or a cobalt-based alloy, a corrosion protective carbon overcoat, and a lubricant topcoat. A disk 110 may include a center portion 111 where the disk can be attached to a drive motor 207 spindle, a landing zone 112, and a data zone 113. The data zone 113 includes numerous closely spaced concentric tracks where data can be stored. During operation, disk 110 is rotated by the motor 207 at speeds regulated by the motor controller 206 under command from processor 208. The rotation of disk 110 results in pressure effects causing air-bearing disk head 121 to float above the surface of the disk 110. As the head 121 floats above the rotating disk 110, the positioner 122, under control of the processor 208 and control circuitry 205, moves the head over the disk's data zone 113. Data can then be read from or written to those tracks by the head 121 under control of read/write control circuitry 203.

A high data rate recording head 121 requires a short magnetic flux reversal time in order to quickly write data to the magnetic media 110. To construct a recording head having a short head flux reversal time, a high recording core height and short core length are desired. High core height and short core length, as well as a narrow pole tip width, are also important for achieving high areal density. However, when a single-piece top pole is formed over a relatively high core, the thick photoresist used to pattern the top pole can result in an undesirably large pole tip width to tip height aspect ratio. This high aspect ratio can cause lateral light scattering and diffraction during the photolithography process used for top pole formation. As a result, critical top pole tip width dimensions may be difficult to control.

Improvements in magnetic recording heads can be obtained using a two-segment top pole structure. The two-segment top pole has a pole tip segment that is formed prior to a formation of the recording head's write core (a.k.a. a write coil), and another segment that is formed after the formation of the write core. Since the pole tip segment is formed prior to the formation of the write core, the pole tip segment may be formed while surrounding photoresist layers are relatively low. This may reduce or eliminate undesirable effects, such as light scattering and diffraction, that can complicate the fabrication of a magnetic recording head.

Figure 3A:
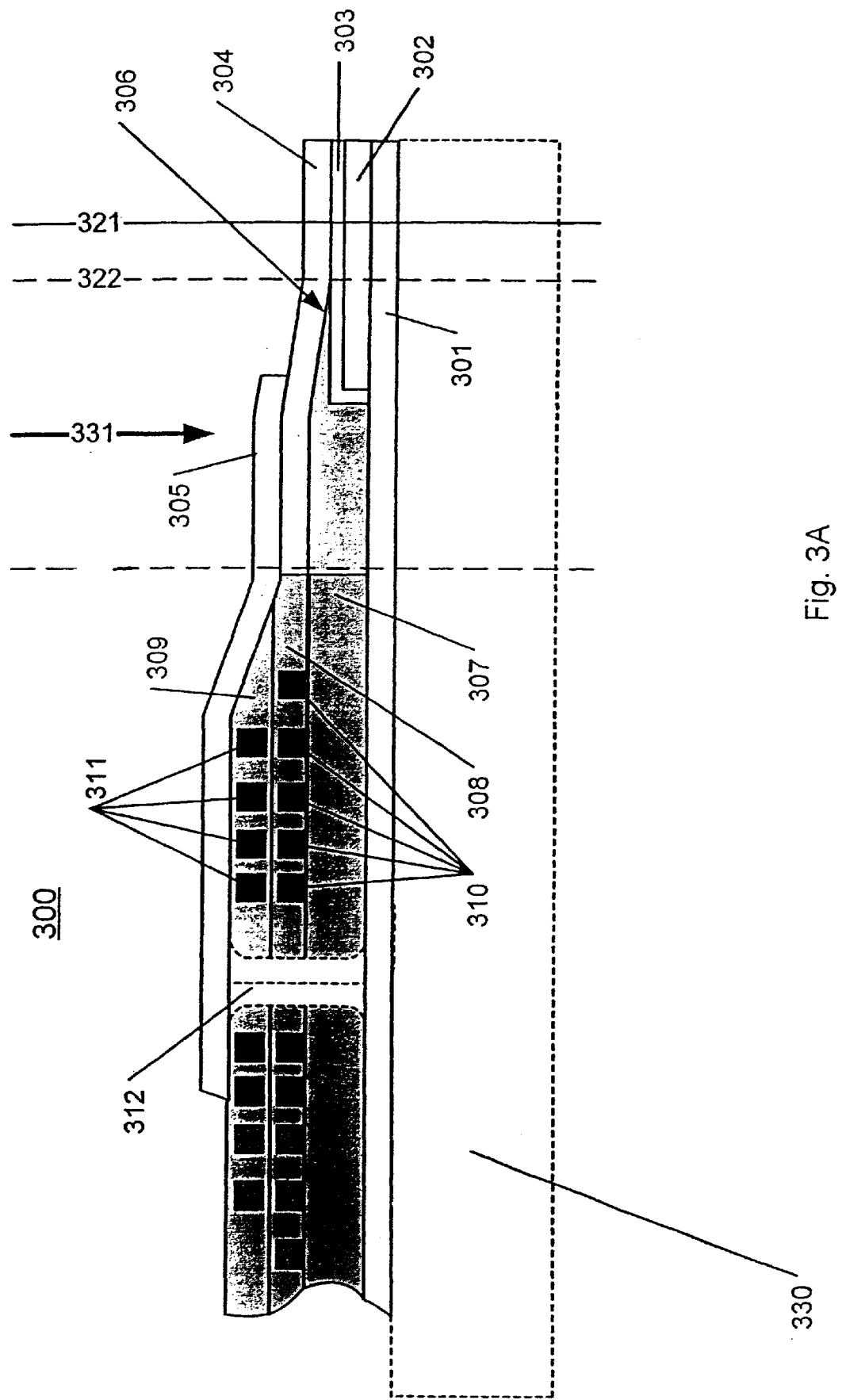
FIG. 3A shows a side cross-sectional view of a thin film magnetic recording head.
Figure 3B:
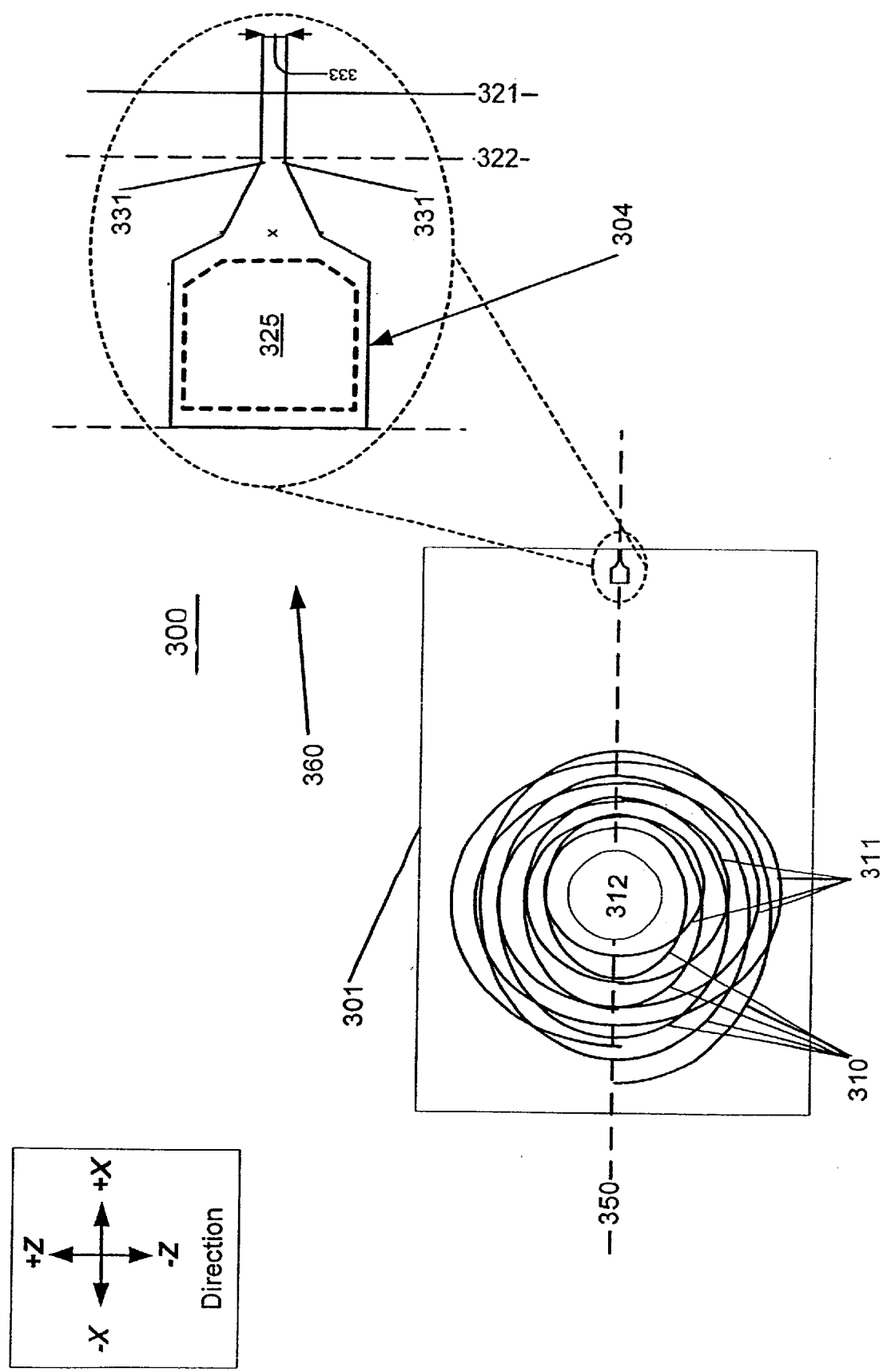
FIG. 3B shows a partial top view of the recording head of FIG. 3A.

FIG. 3A shows a cutaway side view of a recording head 300, the view of FIG. 3A is along axis 350 of FIG. 3B. FIG. 3B shows a partial top view of the recording head of FIG. 3A. In FIG. 3B, a top pole segment 305 of the recording head 300 is removed and an enlarged view 360 of portions of the recording head is shown. Recording head 300 may operate as the "write" component of read/write head 121. The recording head 300 has a top pole formed from two connected segments 304 and 305 of magnetic material. A second top pole segment 305 is magnetically coupled to the first segment 304 at a contact region 331 on the segment 304. The second segment 305 extends over region containing write coils 310 and 311 and through an opening 312 in insulator layers 307–309 to a shared pole 301. The shared pole (also known as a bottom pole) 301 may include a second layer 302 of magnetic material in a tip region.

When the magnetic coils 310–311 is energized, a magnetic flux flows pole segments 301–302, 304–305. Because the segments 301–302, 304–305 are connected and are formed from a magnetically conductive material, magnetic flux flowing through the segments 301–302, 304–305 remains substantially contained within the segments 301–302, 304–305 as the flux flows through them. The magnetic flux also flows from a tip of shared pole segment 302 to a tip of top pole segment 304. However, the presence of a non-magnetic write gap 303 between segments 302 and 304 causes a discontinuity in the flow of the magnetic flux between segment 302 and segment 304. This discontinuity results in an protrusion of the magnetic flux from the pole tips in the +x direction. During head 300 operation, this magnetic flux protrusion can be directed to the surface of a magnetic medium and used to write on the medium.

Top pole segments 304 and 305 can be formed at different times. Thus, implementations can form the first top pole segment 304 prior to the formation of insulating layers 308–309 and recording coils 310–311. Consequently, the top pole segment 304 can be formed while surrounding photoresist layers are relatively thin. This provides better control over top pole tip aspect ratio (i.e., top pole tip height to top pole tip width). Additionally, by forming top pole segment 304 while surrounding photoresist layers are relatively thin, light scattering and diffraction during the formation of the pole tip segment 304 may be reduced and the size of the top pole tip may be more consistently controlled.

The recording head 300 is formed on a surface 330. The surface 330 may be a surface of a wafer formed from alumina titanium carbide or another non-magnetic material. In some implementations, surface 330 may be on top of another structure that is formed on an underlying wafer. For example, a giant magneto-resistive (GMR) read head may first be formed on a wafer, then a shielding material such as alumina may be deposited over the read head structure to serve as the surface 330. Next, the write head 300 can be formed on the surface 330 above the read head. In general, numerous recording heads 300 are simultaneously formed on a surface and then separated into individual recording heads prior to their use in a disk drive 200.

In forming the recording head 300, the shared pole structures 301–302 is formed first. To form the first shared pole surface 301, a plating base (a "seed layer") is first deposited on the surface 330 to facilitate electroplating of the pole surface 301 onto the surface 330. The seed layer may be a nickel-iron (NiFe) layer that is deposited on surface 330 using a sputter deposition technique. Next, the seed layer is covered with a photoresist coating which is baked, rinsed, and spun dry. After that, photolithographic techniques are used to mask, expose, and remove portions of the photoresist so as to reveal portions of the seed layer in an area in which shared pole 301 is to be formed. The shared pole 301 is then formed by plating the exposed seed layer with a magnetically conductive material such as nickel-iron (NiFe). The NiFe plating material may be 45% nickel atoms and 55% iron atoms (45/55 NiFe) or another magnetic material. The remaining photoresist is then removed.

A second shared pole region 302 may be formed on top of the first shared pole 301. To form the second shared pole 302, a new layer of photoresist is placed on the wafer, masked, exposed, and removed to reveal a portion of shared pole 301 where the second shared pole 302 is to be formed. The shared pole 302 is then plated onto the exposed region of shared pole 301. Shared pole 302 can be formed from the same material as shared pole 301, or may use a different magnetically conductive material. After the shared poles 301–302 are formed, any remaining photoresist is removed. Next, a sputter etching process can be used to remove seed layer regions that not covered by the shared pole layers 301–302. In some implementations, another photoresist mask may be placed over the wafer to protect the shared poles 301–302, and photolithographic and wet etch processes can be used to remove unwanted plated material of pole 301 from a field area of the recording head 300.

After the shared poles 301–302 is formed, alumina is again deposited over the wafer to form the gap layer 303. Unwanted alumina may then be removed outside of the gap 303 region. The removed alumina includes alumina deposited in a region where a contact between top pole 305 and bottom pole 301 is to be formed (i.e, in connection region 312). An alumina removal process can include depositing a photoresist mask on the alumina, followed by use of photolithography to expose the regions of the alumina that are to be removed. The exposed alumina can then be removed using a wet etch process.

After the pole layers 301–302 and gap layer 303 are formed, an insulating layer 307 is deposited on the wafer. The insulating layer 307 is deposited on the wafer such that a tip 306 of the insulating layer 307 begins at zero throat point 322 (tip 306 forms part of a zero throat region of insulating layer 307). The tip 306 of the insulating layer slopes upward towards the write coil regions 310, 311 of the recording head. The upward slope of the tip region 306 is determined by curing properties of the deposited insulating layer 306 material. The leading point of the tip 306 lies at zero throat point 322. The zero throat point 322 is the point at which the top pole surface 304 of a finished head 300 separates from the gap region 303. In some implementations, the insulating region 306 is deposited in two steps. In the first step, a high precision deposition of the zero throat insulating layer (which includes tip region 306) is performed. A second step is subsequently used to deposit the remainder of the layer 307.

A first top pole segment 304 is then formed over the zero throat region of the insulating layer 307. Formation of the top pole segment 304 begins with a sputter deposition of a seed layer (e.g., NiFe) over the wafer. Next, photoresist is deposited on the seed layer and a photolithographic process is used to mask, expose, and remove the photoresist to expose the seed layer in a region where top pole 304 is to be formed. A NiFe layer is then plated onto the exposed seed layer to form the first top pole 304. The remaining photoresist is then removed and a sputter etching process is used to remove any remaining exposed seed layer.

Next, write coils 310–311 are formed. To make the coils 310–311, a copper seed layer is deposited over the wafer and coated with photoresist. Photolithography is used to remove portions of the deposited photoresist and expose a pattern of coil 310 on the copper seed layer where the coils 310 are to be formed. Copper may then be plated onto the exposed seed layer to form the coils 310. Remaining photoresist is then removed, followed by sputter etching to remove the remaining exposed copper seed layer. A second insulator 308 (e.g., of baked photoresist) is then deposited over the first insulator layer 307 and coils 310. The described coil formation process may be repeated to form a second set of coils 311. That is, a second copper seed layer is applied over the wafer and covered with photoresist which is removed to expose a coil 311 pattern in the second seed layer, the second set of coils is deposited, the photo resist layer is removed to expose the remaining seed layer, and the remaining seed layer is removed by is sputter etching. The first set of coils 310 and second set of coils 311 may be connected through a region of photoresist 308 that is removed prior to forming the second coil layer 311. A top insulating layer 309 is then applied over the coils 311.

Once the coils 310 and 311 are complete, a second top pole segment 305 is formed. Prior to forming the second top pole segment 305, any remaining photoresist and/or alumina in region 331 of the first top pole 304 or in a connecting region 312 through the insulating layers 307–309 is removed. A NiFe seed layer is then applied to the surface of the wafer, followed by a photoresist layer. The photoresist layer is removed using photolithography process to expose a pattern of the top pole 305 in the seed layer. The second top pole 305 is then deposited onto the exposed NiFe seed layer. When the second top pole layer is deposited, it will form a connection to the first top pole 304 at region 331 and to the shared pole 301 via an opening 312 in the insulating layers 307–309.

After the structures 301–312 has been completed, the head structure 300 is lapped to form an air bearing face. The solid line 321 demarcates a portion of the head 300 and substrate 330 that are lapped away to form the magnetic head. In particular, sections of head 300 and substrate 330 to the right of line 321 are lapped away. The lapping process is precision controlled to achieve a desired gap height (gap height is defined as the distance from the zero throat region demarcated by line 322 to the air bearing surface demarcated by line 321). The gap height determines the sharpness and strength of magnetic flux protruding from the air bearing surface of an operating head. In general, as the gap height decreases, the magnetic flux extending from the gap increases in strength; however, the sharpness of the flux decreases. Thus, an excessive gap height will decrease the strength of the flux which may prevent effect writing on a magnetic medium; on the other hand, decreasing the gap height may result in over saturation at the head which can reduce writing density. Consequently, the gap height must be carefully controlled to produce an functional head. Head 300 may have a gap height of approximately one to two microns. The dimension 333 of the pole tips is also an important factor in determining write flux characteristics for the head 300. Implementations may use a pole tip dimension 333 of approximately 0.5 microns to achieve a write density on the order of ten gigabits per square inch. Other pole tip dimensions and write densities also may be used.

A number of embodiments of the present invention have been described. Nevertheless, it will be understood that various modifications may be made without departing from the spirit and scope of the invention. For example, different magnetic and non-magnetic materials may be used, shapes of top and shared pole segments may be changed, the described photolithographic deposition, and etching processes may be replaced by alternative processes (e.g., reactive ion etching, molecular beam epitaxy, etc.), and dimensions and shapes may be altered. Accordingly, other embodiments are within the scope of the following claims.

What is claimed is:

1. A thin film magnetic head having an air bearing surface, comprising:
   a first shared pole including a proximal end and a distal end, said proximal end forming a portion of said air bearing surface;
   a second shared pole including a proximal end and a distal end, said proximal end of said second shared pole forming a portion of said air bearing surface, the second shared pole positioned on top of said first shared pole, said first shared pole and said second shared pole comprising a first pole tip;
   a first top pole segment comprising a second pole tip, wherein the first top pole segment includes a proximal end and a distal end, said proximal end of said first top pole segment forming a portion of the air bearing surface;
   a write gap layer positioned between the first pole tip and the second pole tip;
   a second top pole segment being recessed from the air bearing surface and connected to the distal end of the first top pole segment and to the first shared pole; and
   a first write coil positioned between the second top pole segment and the first shared pole.

2. The thin film magnetic head of claim 1 further comprising an insulating layer separating the first write coil from the first shared pole and the first top pole segment.

3. The thin film magnetic head of claim 1 wherein the second top pole segment comprises a connection extending through a center of the first write coil and connecting to the first shared pole.

4. The thin film magnetic head of claim 1 further comprising a zero throat insulating layer comprising a region of increasing separation between the first shared pole and the first top pole segment.

5. The thin film magnetic head of claim 1 further comprising a second write coil coupled to the first write coil and positioned between the first shared pole and the second top pole segment.

6. A thin film magnetic head having an air bearing surface, comprising:
   a first shared pole including a proximal end and a distal end, said proximal end forming a portion of said air bearing surface;
   a second shared pole including a proximal end and a distal end, said proximal end of said second shared pole forming a portion of said air bearing surface, the second shared pole positioned on top of said first shared pole, said first shared pole and said second shared pole comprising a first pole tip;
   a first top pole segment comprising a second pole tip, wherein the first top pole segment includes a proximal end and a distal end, said proximal end of said first top pole segment forming a portion of the air bearing surface;
   a write gap layer positioned between the first pole tip and the second pole tip;
   a second top pole segment being recessed from the air bearing surface and connected to the distal end of the first top pole segment and to the first shared pole;
   a first write coil positioned between the second top pole segment and the first shared pole; and
   an insulating layer separating the write coil from the first shared pole and the first top pole segment.

7. The thin film magnetic head of claim 6, wherein the second top pole segment comprises a connection extending through a center of the first write coil and connecting to the first shared pole.

8. The thin film magnetic head of claim 6, further comprising a zero throat insulating layer comprising a region of increasing separation between the first shared pole and the first top pole segment.

9. The thin film magnetic head of claim 6, further comprising a second write coil coupled to the first write coil and positioned between the first shared pole and the second top pole segment.

10. A thin film magnetic head having an air bearing surface, comprising:
    a first shared pole including a proximal end and a distal end, said proximal end forming a portion of said air bearing surface;
    a second shared pole including a proximal end and a distal end, said proximal end of said second shared pole forming a portion of said air bearing surface, the second shared pole positioned on top of said first shared pole, said first shared pole and said second shared pole comprising a first pole tip;
    a first top pole segment comprising a second pole tip, wherein the first top pole segment includes a proximal end and a distal end, said proximal end of said first top pole segment forming a portion of the air bearing surface;
    a write gap layer positioned between the first pole tip and the second pole tip;
    a second top pole segment being recessed from the air bearing surface and connected to the distal end of the first top pole segment and to the first shared pole;
    a first write coil positioned between the second top pole segment and the first shared pole; and
    a zero throat insulating layer comprising a region of increasing separation between the write gap layer and the first top pole segment.

11. The thin film magnetic head of claim 10, further comprising an insulating layer separating the first write coil from the first shared pole and the first top pole segment.

12. The thin film magnetic head of claim 10, wherein the second top pole segment comprises a connection extending through a center of the first write coil and connecting to the first shared pole.

13. The thin film magnetic head of claim 10, further comprising a second write coil coupled to the first write coil and positioned between the first shared pole and the second top pole segment.

* * * * *